US012615187B2

(12) United States Patent
Bragalone et al.

(10) Patent No.: US 12,615,187 B2
(45) Date of Patent: Apr. 28, 2026

(54) DYNAMIC CLOUD RESOURCE ALLOCATION USING MACHINE LEARNING

(71) Applicant: Capital One Services, LLC, McLean, VA (US)

(72) Inventors: Michael Bragalone, Jersey City, NJ (US); Joshua Edwards, Philadelphia, PA (US); Brent Segner, Marysville, OH (US)

(73) Assignee: Capital One Services, LLC, McLean, VA (US)

( * ) Notice: Subject to any disclaimer, the term of this patent is extended or adjusted under 35 U.S.C. 154(b) by 150 days.

(21) Appl. No.: 18/766,922

(22) Filed: Jul. 9, 2024

(65) Prior Publication Data

US 2026/0019333 A1     Jan. 15, 2026

(51) Int. Cl.
| | |
|---|---|
| *H04L 12/24* | (2006.01) |
| *H04L 41/08* | (2022.01) |
| *H04L 41/0803* | (2022.01) |
| *H04L 41/16* | (2022.01) |
| *H04L 47/78* | (2022.01) |

(52) U.S. Cl.
CPC .......... *H04L 41/0883* (2013.01); *H04L 41/16* (2013.01); *H04L 47/781* (2013.01)

(58) Field of Classification Search
CPC .... H04L 41/0883; H04L 41/16; H04L 47/781
USPC ........................................................ 709/220
See application file for complete search history.

(56) References Cited

U.S. PATENT DOCUMENTS

| | | | | |
|---|---|---|---|---|
| 11,797,769 | B1 * | 10/2023 | Gangadharaiah .... | G06N 3/0442 |
| 2015/0356085 | A1 * | 12/2015 | Panda ...................... | G06N 5/04 |
| | | | | 707/748 |
| 2017/0124487 | A1 * | 5/2017 | Szeto .................. | G06F 11/1448 |
| 2018/0004363 | A1 * | 1/2018 | Tompkins ............. | G06F 3/0482 |
| 2018/0276256 | A1 * | 9/2018 | Sarkar ................. | G06F 18/2321 |
| 2019/0306023 | A1 * | 10/2019 | Vasseur ................... | H04L 43/50 |

(Continued)

OTHER PUBLICATIONS

Xiao, Ai, et al., "SARA: Stably and quickly find optimal cloud configurations for heterogeneous big data workloads," ScienceDirect, Applied Soft Computing, vol. 85, Dec. 2019, 9 pages.

(Continued)

*Primary Examiner* — Moustafa M Meky
*Assistant Examiner* — Elizabeth Kassa
(74) *Attorney, Agent, or Firm* — Banner & Witcoff, Ltd.

(57) ABSTRACT

Methods, systems, and apparatuses are described herein for automatically recommending cloud server configuration changes. A machine learning model may be trained to output infrastructure modification recommendations based on a history of performance measurements of a server environment that executes one or more applications. Input data indicating a current configuration of the server environment may be provided to the trained machine learning model. In response, the trained machine learning model may output a recommended change to the server environment. Based on comparing the risk score to a threshold associated with the one or more applications, users might be provided with the option to implement the recommended change by modifying one or more operating parameters of one or more servers of the server environment. Additionally and/or alternatively, the recommended change may be automatically implemented.

20 Claims, 5 Drawing Sheets

(56) References Cited

U.S. PATENT DOCUMENTS

| | | | |
|---|---|---|---|
| 2023/0164029 A1* | 5/2023 | Mermoud | H04L 41/145 |
| | | | 709/220 |
| 2023/0244687 A1* | 8/2023 | Salim | G06F 16/256 |
| | | | 707/602 |
| 2024/0176336 A1* | 5/2024 | Bhatia | G05B 19/41875 |
| 2024/0176338 A1* | 5/2024 | Li | G05B 19/4188 |
| 2025/0363981 A1* | 11/2025 | Wada | G10L 15/063 |
| 2025/0385835 A1* | 12/2025 | Mohanty | H04L 41/0806 |

OTHER PUBLICATIONS

"Cloud and Kubernetes Optimization for Google Cloud Platform," Densify, date of publication unknown but, prior to Apr. 22, 2024, 6 pages.
Ospina, Alexander, "The Future of Cloud Cost Management: AI and Machine Learning on AWS," Mar. 11, 2024, 10 pages.
Zhang, Yifan, et al., "Application of Machine Learning Optimization in Cloud Computing Resource Scheduling and Management," first date of publication of unknown but, prior to Apr. 22, 2024, 7 pages.
Ghosh, Samadrita, "A Comprehensive Guide to Data Preprocessing," Aug. 22, 2023, MLOps Blog, 16 pages.

* cited by examiner

FIG. 4

DYNAMIC CLOUD RESOURCE ALLOCATION USING MACHINE LEARNING

FIELD OF USE

Aspects of the disclosure relate generally to server configurations. More particularly, aspects described herein use machine learning techniques to improve cloud server architectures.

BACKGROUND

As part of providing one or more applications, organizations might rely on very complex cloud server environments. For example, a company might provide a variety of applications (e.g., e-mail applications, chat applications, web servers, banking applications) on a variety of different servers. Those different servers might be implemented on a variety of different cloud server infrastructures: for instance, the same company might execute applications on Amazon Web Services ("AWS") cloud servers provided by Amazon.com, Inc. of Seattle, Washington and Microsoft Azure servers provided by Microsoft Corporation of Redmond, Washington. This can introduce significant difficulty for administrators of such networks: after all, the sheer volume, complexity, and nuance of such server environments can make them difficult to manage and modify.

One particular issue for many organizations with complex cloud server environments is that it can be difficult to optimize server environments, particularly in view of application constraints and different organizations' changing risk tolerances. For instance, it may be difficult for a network administrator to properly assess the risk of switching an application server (e.g., one that implements an authentication service) from an AWS-based environment to an Azure-based environment, let alone for that network administrator to assess whether the change would be advantageous (e.g., in terms of speed, availability, or the like).

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to automatically identifying recommended improvements to cloud server configurations. A machine learning model may be trained based on various performance measurements of a server environment. For example, a trained machine learning model may be trained based on a history of various changes to a server environment that provides one or more applications, including instances in which changes improved application performance, incurred additional cost, or the like. The machine learning model may then be provided with input indicating a current configuration of the server environment, which may prompt the machine learning model to output one or more recommended changes to the server environment. This output might indicate recommended changes in server environments, such as a recommendation to switch one server from one cloud environment to another. This output may additionally and/or alternatively indicate a degree of risk (e.g., a risk score) associated with the change, such as whether the change would potentially result in downtime, additional cost, or the like. Such output might be processed by a natural language processing algorithm such that the recommended change(s) are described in natural language (e.g., "If you switch from AWS to Azure, you will increase predicted uptime reliability by 10%"). Such recommendations might be automatically implemented (such as where the risk is sufficiently low, as may be determined by comparing a risk score to a threshold) and/or may be presented to a user for user input. Such a process may be performed periodically, such that the server environment may be periodically improved based on, for example, further training of the machine learning model, further changes to the server environment (e.g., changes to applications provided by the server environment), and additional information about the server environment.

More particularly, a computing device may receive training data comprising a history of performance measurements of a server environment that executes one or more applications. The computing device may generate a trained machine learning model to output infrastructure modification recommendations by training, based on the training data, a machine learning model implemented using an artificial neural network. The training data may comprise, for example, application usage data for the one or more applications, application infrastructure metrics associated with the one or more applications, cost data associated with the one or more applications, and/or control data associated with the one or more applications. Training the machine learning model may comprise modifying one or more weights of the artificial neural network based on the training data. The computing device may provide, to the trained machine learning model, input data comprising an indication of a current configuration of the server environment. The computing device may then receive, as output from the trained machine learning model and in response to the input data, an indication of a recommended change to the server environment. The indication of the recommended change to the server environment may comprise a risk score associated with the recommended change. Based on comparing the risk score to a threshold associated with the one or more applications, the computing device may cause output, by a second computing device, of a user interface element that provides an option to implement the recommended change to the server environment. Then, based on user input received in response to the user interface element, the computing device may implement the recommended change by modifying one or more operating parameters of one or more servers of the server environment. Modifying the one or more operating parameters may comprise modifying a quantity of computing resources available to the one or more servers and/or modifying a quantity of servers that execute the one or more applications. Additionally and/or alternatively, the one or more servers may be executing in a first cloud environment, and modifying the one or more operating parameters of the one or more servers of the server environment may comprise implementing the one or more servers in a second cloud environment different than the first cloud environment.

Users might be provided with information about the recommended changes in a manner which provides a description of the changes in a human-friendly manner. For example, the computing device may generate a narrative description of the recommended change by providing, as input to a natural language processing algorithm, the indication of the recommended change. In turn, the user interface element described above may comprise the narrative description of the recommended change.

The machine learning model may be provided with constraints of the server environment, such as one or more operating requirements and/or legal requirements of the server environment. For instance, the computing device may determine one or more operating constraints of the one or more applications provided by the server environment. Then, the input data provided to the machine learning model may comprise an indication of the one or more operating constraints.

The computing device may automatically implement some recommendations, particularly when the possible risk of such recommendations is low. For example, the computing device may receive, as output from the trained machine learning model and in response to the input data, a second indication of a second recommended change to the server environment. The second indication of the second recommended change to the server environment may comprise a second risk score associated with the second recommended change. Then, based on comparing the second risk score to the threshold associated with the one or more applications, the computing device may automatically implement the second recommended change.

The machine learning model may be configured to, as part of outputting a recommendation, indicate how similar the recommended server environment (e.g., the environment reflecting recommended changes) is to the current configuration of the server environment. For example, the indication of the recommended change to the server environment may further comprise a similarity score. That similarity score may be based on a comparison of the current configuration of the server environment to a modified configuration of the server environment that reflects the recommended change to the server environment.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts a process whereby training data is cleaned as part of a data cleaning phase.

DETAILED DESCRIPTION

Figure 1:
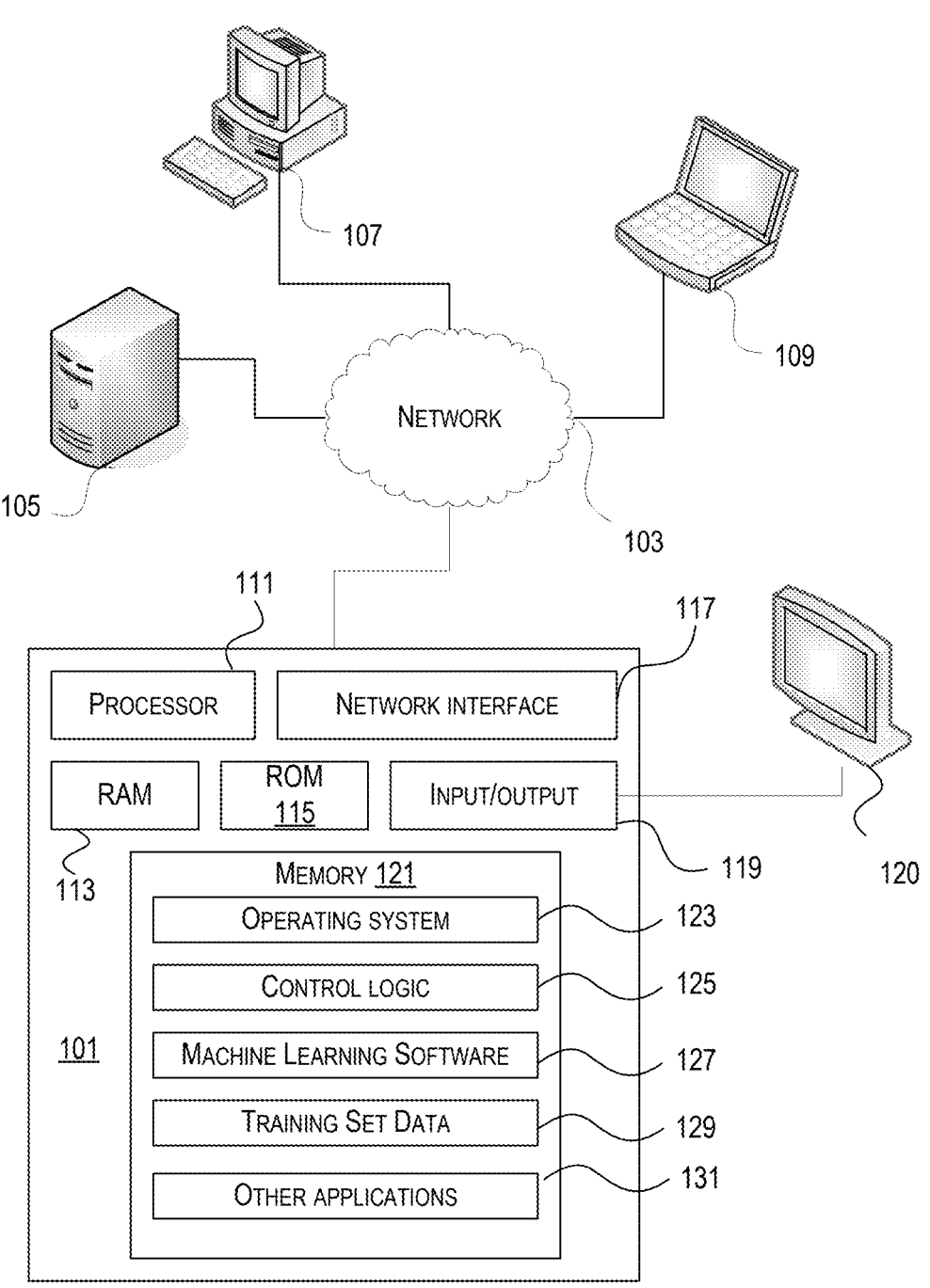
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, it can be difficult to ascertain how changes to a network (e.g., switching one server from one cloud server environment to another, adding network resources, removing those resources, adding redundancy) may affect a server environment, particularly where the environment is complicated. This issue becomes particularly complex when cost is taken into account: the sheer addition of additional network resources, while tempting, might incur an undesirable amount of cost. Adding to this complexity, server networks change over time (e.g., applications become more or less popular, additional applications might be implemented, etc.), meaning that server environment modifications that might have made sense at a past time might no longer be viable in view of current server utilization. That problem can become extremely complicated when, as is sometimes the case, organizations manage hundreds (if not thousands) of applications via a server environment. In turn, network administrators often find it difficult to identify and implement changes to a server environment, particularly where those changes are nuanced (e.g., changing a server from one cloud server environment to another, which might not necessarily guarantee additional uptime but might have other, more nuanced benefits).

To remedy these and other problems, aspects described herein leverage machine learning to automatically (and, in some cases, periodically) analyze a server environment and identify recommended changes for that server environment. Stated differently, a system may use a machine learning model trained across all types of cloud and non-cloud workloads of a server environment to make infrastructure recommendations for that cloud environment, with a specific focus on recommending changes based on considerations such as historical application usage, cost efficiency, and the like. The system is also risk-aware, such that the model can calculate a forward-looking risk score for each recommended change such that users can adequately balance the potential upsides and downsides of any change to the server environment. Those changes might be automatically implemented, such as where the risk of those changes is known to be particularly low and/or where the change is particularly minimal (as might be evidenced by a similarity score that compares the server environment pre- and post-change). Additionally and/or alternatively, the changes might be output to one or more users, who might have the option to implement the changes. In this manner, even for fast-changing server environments, machine learning can be leveraged to identify and improve cloud environments in a manner which can promote uptime, save money, and which can minimize risk to the server environment as a whole.

One benefit of the aspects described herein is the focus on application-level improvements. The aspects described herein do not simply optimize servers in a rudimentary way, such as by encouraging users to throw unnecessary amounts of processing power at every possible computing issue. Rather, in view of cost considerations, application performance and constraints (e.g., as might be specified in a service-level agreement) are used to optimize server environments. Stated differently, one clever aspect of the processes described herein is that machine learning is used to optimize server environments in view of the limitations and needs of applications and in view of cost considerations, rather than simply by applying proverbial bandages on processing issues by throwing more processing power at a problem.

Another benefit to the disclosure herein is that it accounts for changes to how applications run and scale over time. Applications may be added, removed, and/or modified over time, meaning that their needs and constraints might change over time. Moreover, to account for such changes, it is often insufficient to simply add computing resources or increase the size of existing computing resources: both are often required at the same time (a process sometimes referred to as "diagonal scaling"). The processes described herein are responsive to such application changes and are also capable of such diagonal scaling.

To provide an example of the above concept, a computing device may train a machine learning model based on years of performance measurements of a server environment of an organization. For example, the machine learning model might be provided, as training data, a history of how changes to the environment (e.g., addition and/or removal of computing resources, changes to various protocols) affected the environment. Then, the computing device may provide, to that trained machine learning model, information about the current configuration of the organization's server environment. For instance, uptime statistics, utilization statistics, and similar data might be provided to the model. Then, the trained machine learning model might provide two recommendations. A first recommendation might have a low risk score and recommend that a particular cloud server be switched from a "small" size server to a "medium" sized server (that is, that additional computing resources might be allocated to the server by, for example, paying a cloud service provider more for that particular server). A second recommendation might have a medium-high risk score and recommend that a first cloud server providing an authentication application should be switched from a first cloud environment (e.g., AWS) to a second cloud environment (e.g., Azure). The first recommendation might be automatically implemented due to the risk score being low; however, a user might be prompted to approve the implementation of the second recommendation. As part of prompting the user, natural language processing techniques may be used to describe the changes to appropriate users in a human-friendly way. For example, rather than displaying some abstract concept such as "Server Y03 AWS→Azure 3% uptime," natural language processing techniques may be used to indicate "If you switch Server ID Y03 from AWS to Azure, the system predicts a 3% increase in system uptime" or the like.

Aspects described herein improve the functioning of computers by providing a system which automatically processes computing device performance (and, more generally, the performance of an infrastructure of a wide variety of computing devices) to improve computing device performance. The complexity of server infrastructures, particularly as they are implemented on the cloud, can make it prohibitively difficult for human administrators to identify opportunities to improve server performance. To remedy this issue, aspects described herein leverage unique machine learning techniques to identify opportunities to improve server performance and, where applicable, automatically implement recommended changes. The complexity and fast-changing nature of such server environments makes it impossible for any arrangement of humans to perform this process, mentally or otherwise.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
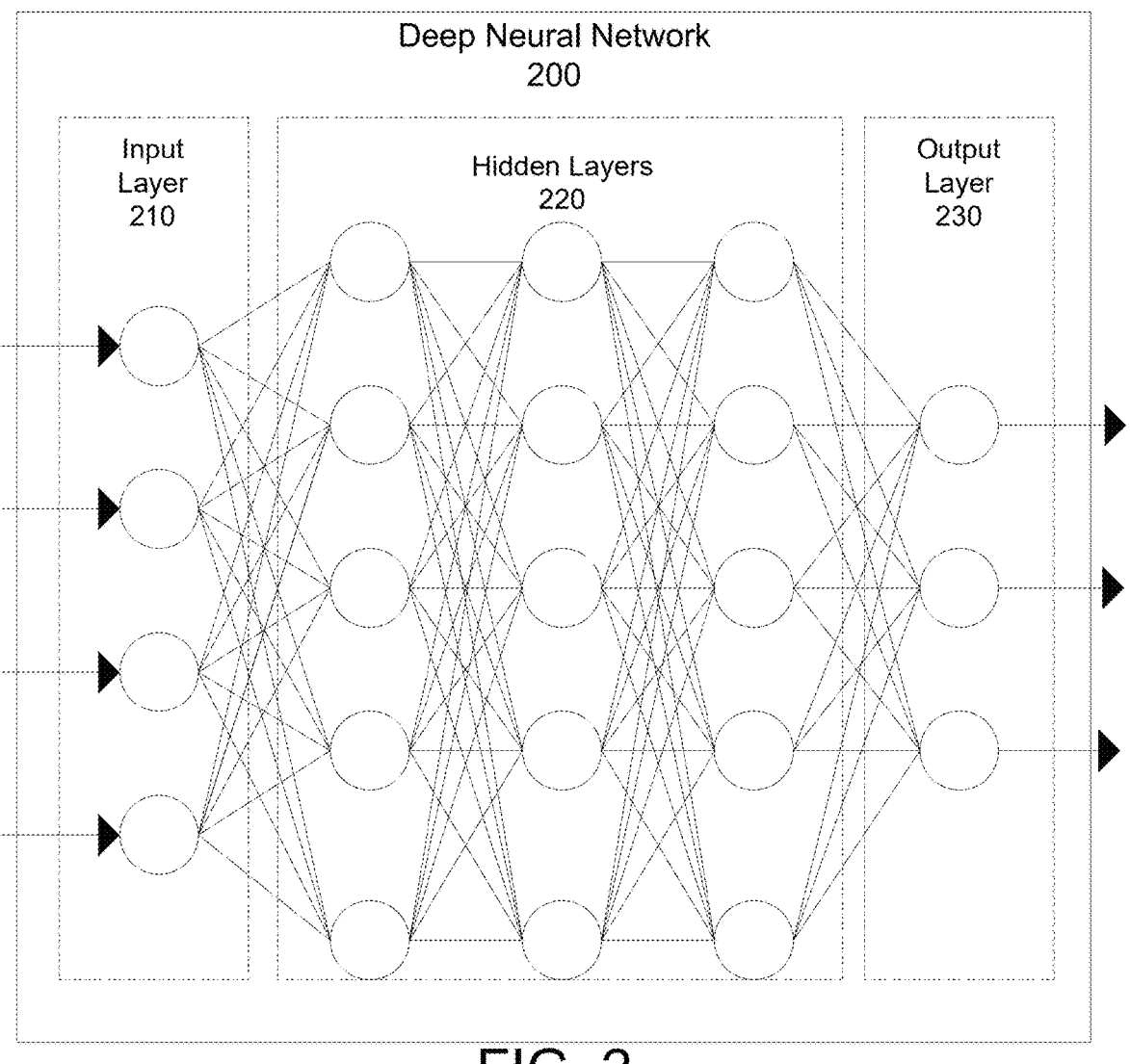
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
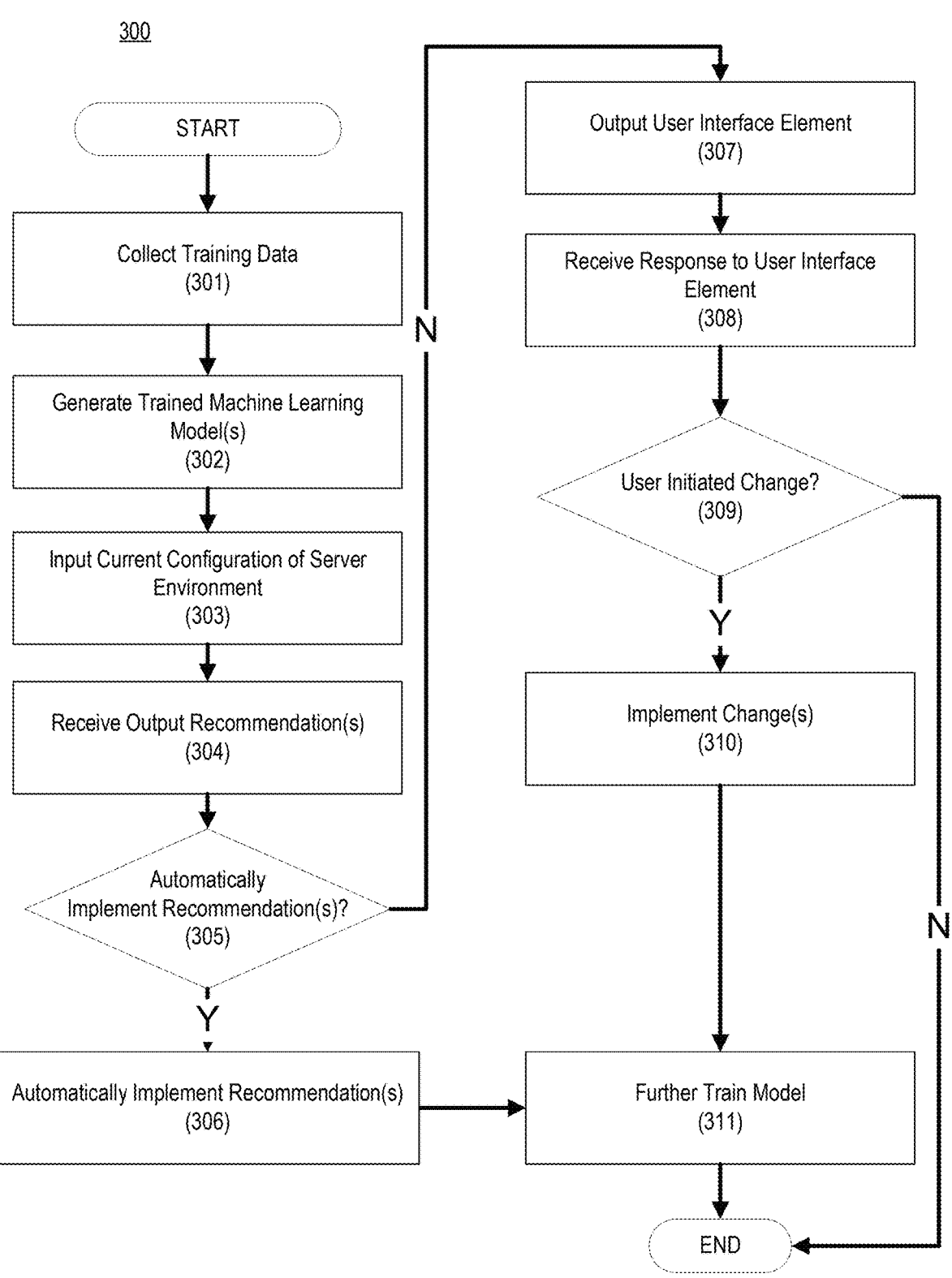
FIG. 3 depicts a method comprising steps for automatically recommending server configuration changes which may be performed by a computing device, such as any one of the devices described with respect to FIG. 1 and/or FIG. 2.

FIG. 3 depicts a method 300 comprising steps for automatically recommending server configuration changes which may be performed by a computing device, such as any one of the devices described with respect to FIG. 1 and/or FIG. 2. The steps shown in FIG. 3 are illustrative, and may be re-arranged, omitted, and/or modified as desired. A computing device may comprise one or more processors and memory storing instructions that, when executed by the one or more processors, cause the performance of one or more of the steps depicted in FIG. 3. One or more non-transitory computer-readable media may store instructions that, when executed, cause the performance of one or more of the steps depicted in FIG. 3.

For illustrative purposes, FIG. 3 begins with a description of how a trained machine learning model may be generated. In some cases, the steps involving the training of this machine learning model may be omitted, and a pre-trained machine learning model may be received and implemented. For example, rather than training a machine learning model in-house based on its own server environment, an organization might instead use a machine learning model trained by a third party (e.g., a vendor). As another example, a different computing device (e.g., a second computing device) also maintained by the organization might train the machine learning model, then provide it to the computing device described with respect to FIG. 3. In that example, FIG. 3 might be thereby performed, albeit by different computing devices of the same organization (and, e.g., at different times: the trained machine learning model might have been generated long before steps such as step 303 are performed).

In step 301, the computing device may collect training data. The training data may comprise any information about the server environment, such as a history of the server environment, change(s) made to the server environment over time, known issues with the server environment, one or more applications provided by the server environment, or the like. For example, the computing device may receive training data comprising a history of performance measurements of a server environment that executes one or more applications. The training data may comprise application usage data for the one or more applications. Such application usage data might indicate a frequency with which one or more applications are used, an importance of the one or more applications (e.g., to business availability), known downtime(s) of the one or more applications, or the like. The training data may comprise application infrastructure metrics associated with the one or more applications. The application infrastructure metrics may indicate, for example, how many different servers are used to provide one or more applications (including whether one or more servers are redundant). The training data may comprise cost data associated with the one or more applications. Cost data might indicate a cost of operating one or more servers, such as a cost paid to a cloud server provider for uptime, a particular server size, or the like. The training data may comprise control data associated with the one or more applications. For example, the control data may indicate which server(s) (if any) may be modified automatically.

As part of step 301, the computing device may be configured to monitor the server environment over time. For example, the computing device may periodically retrieve logs from one or more servers, cloud infrastructure providers, and/or one or more applications. In this manner, the computing device may determine the training data by actively monitoring activity in the server environment and, where appropriate, tagging instances in the data where one or more changes to the server environment are implemented (by the computing device or otherwise).

As will be described here and elsewhere, the server environment may be implemented all or partially via one or more cloud server environments. For instance, a portion of an organization's application infrastructure might be implemented locally (e.g., at the offices of the organization), whereas another portion of the organization's application infrastructure might be implemented using AWS, and yet another portion of the organization's application infrastructure might be implemented using Azure. This can implicate different types of operating parameters and/or utilization statistics for different portions of the server environment. For instance, it might be particularly financially and time-wise costly to instantiate new local servers (as, after all, an organization might have to physically buy new hardware and wait for it to be installed), while it might be somewhat cheaper and quicker to instantiate new cloud servers (as many cloud service providers allow users to instantiate new servers on-the-fly). As another example, while low utilization of local hardware might be tolerable (as the hardware is already purchased and the electricity use might be low), low utilization of remote server resources might be undesirable (e.g., because applicable contracts might charge for such a server on a periodic basis, even when relatively underused).

One advantage of this training process is that the machine learning model may be trained based on a variety of cloud workloads. In this manner, the trained machine learning model(s) might be trained not merely based on a history of the cloud server environment maintained by an organization, but a wide variety of cloud server environment(s), including those associated with different organizations and/or applications. In this manner, the training data might reflect a history of changes made to a wide variety of different server environments, thereby allowing machine learning models trained based on such training data to understand and recommend changes even if those changes have never been made in a particular server environment.

The training data may comprise historical application usage metrics, application efficiency metrics, infrastructure usage metrics, spend efficiency, and/or application constraints. Historical application usage metrics may comprise any information about how one or more applications were used, such as a history of utilization, a history of which application(s) were executed (and on what servers), and the like. Application efficiency metrics may indicate, for example, how well an application ran (e.g., how often users experienced delay). Infrastructure usage metrics may comprise, for example, an indication of how often server resources were used (or not used) over time. Spend efficiency may indicate, for example, how well server(s) provided one or more applications based on a cost of providing such servers (e.g., in terms of monthly costs provided to a cloud service provider). Application constraints may indicate, for instance, computing resource requirements (e.g., a minimum amount of memory, storage space, processing ability) for one or more applications.

The training data may be processed and/or prepared as part of a data cleaning phase, as will be described in more detail below with respect to FIG. 4.

In step 302, the computing device may generate one or more trained machine learning models. Generating a trained machine learning model may comprise using the training data collected in step 301 for machine learning. For example, the computing device may generate a trained machine learning model to output infrastructure modification recommendations by training, based on the training data, a machine learning model implemented using an artificial neural network. The machine learning model may be implemented using an artificial neural network, such as that described with respect to FIG. 2.

A plurality of different machine learning models might be generated as part of step 302. For example, in some cases, different machine learning models might be used to generate different parts of an analysis of the current configuration of a server, and the output of such machine learning models may be combined to form one or more recommendations. For instance, one machine learning model might be configured to recommend changes to server size, another machine learning model might be configured to recommend changes to cloud network providers, and yet another machine learning model might be configured to recommend changes to communication protocols. As another example, one machine learning model might be configured to provide recommended changes, whereas another machine learning model might be configured to predict risk associated with the recommended changes (e.g., such that output of the former machine learning model becomes input to the latter machine learning model).

In step 303, the computing device may input, into the trained machine learning model, a current configuration of the server environment. For example, the computing device may provide, to the trained machine learning model, input data comprising an indication of a current configuration of the server environment. The current configuration of the server environment may refer to any data relating to the server environment, such as a quantity of servers, whether one or more servers are implemented remotely or locally, a service provider associated with the one or more servers, a communications protocol associated with the one or more servers, a utilization of the one or more servers, a quantity of failures associated with the one or more servers, a type of failure(s) associated with the one or more servers, or the like.

The input to the trained machine learning model may comprise one or more constraints of the server environment. Server environments may be limited in terms of their operation in a variety of ways: for instance, some server environments might require a certain quantity of servers for the purposes of proper redundancy when providing one or more applications, some server environments might be required to use certain encryption protocols for data privacy compliance, and some organizations might have a limited quantity of funds that can be devoted to new/existing server hardware. In some cases, such constraints might originate from service-level agreements. In turn, the constraints on such server environments may be provided as input to the trained machine learning model such that the recommendations do not violate those constraints. For example, the computing device may determine one or more operating constraints of the one or more applications provided by the server environment. To determine such constraints, the computing device may process one or more rules provided by administrators, may process descriptive text associated with the one or more applications and/or the one or more servers, or the like. In such an example, the input data may further comprise an indication of the one or more operating constraints.

As one example of constraints, a constraints configuration file may be required. That constraints configuration file may contain information on the one or more applications provided by the server environment, an expected workload (for the applications, servers, and/or environment as a whole), an expected number of users (for the applications, servers, and/or environment as a whole), and/or a desired infrastructure (e.g., primarily cloud-based, primarily local).

In step 304, the computing device may receive one or more recommendations as output from the trained machine learning model(s). The one or more recommendations may be based on the input provided in step 303. For example, the computing device may receive, as output from the trained machine learning model and in response to the input data, an indication of a recommended change to the server environment. The one or more recommendations may comprise one or more recommended changes (e.g., recommended infrastructure changes) to the server environment, and may relate to a recommended change in a quantity of server resources (e.g., a quantity of memory, a quantity of storage space, available processing capacity), a recommended change in a cloud service provider, a recommended change in bandwidth availability, a recommended change in a communication and/or encryption protocol, or the like. The nature of the recommended changes may vary based on the nature of the server environment and the one or more applications provided via that server environment. For example, for applications provided by the Internet, then changes relating to bandwidth, the addition of servers to particular regions of the world, redundancy, and the like might be particularly common. As another example, for applications involving sensitive data provided by an intranet, then recommended changes might relate to encryption protocols, data storage policies, and the like.

The indication(s) of the recommended change to the server environment may comprise a risk score associated with the recommended change. Different changes to a server environment might correspond to different levels of risk. For example, while providing a server additional processing resources might not be particularly risky (as, after all, the worst-case scenario might be presumed to be that the resources are wasted), lowering the quantity of resources provided to a server might be significantly riskier (as the server might run more slowly, be prone to crashing, or the like). As another example, encrypting certain data on a server might be risky for certain applications (e.g., applications where speed is critical and security is not), encrypting data might not be particularly risky (and, in fact, might be arguably safe) for other applications (e.g., applications involving sensitive data where speed is not as critical). As suggested above, the risk score might be determined by a different machine learning model as compared to the machine learning model providing the recommended change(s). For instance, the recommended change(s) of a first machine learning model might be provided as input to a second machine learning model trained to output a risk score based on such input. The risk score may be based, in part, on a number of changes that might be made as part of a single recommendation. For example, changes involving modification of a single operating parameter (e.g., memory) might be slightly less risky than changes involving modification of a plurality of different operating parameters (e.g., memory and bandwidth and server location and server operating system).

The indication(s) of the recommended change to the server environment may comprise a similarity score (e.g., using vectorization and cosine similarity). It may be desirable to ascertain how different a recommended change would make a server environment as compared to its current configuration: after all, significant changes might not only be risky, but might require different implementation strategies (e.g., implementation outside of business hours). Such similarity scores may be based on a comparison of the current configuration of the server environment to a modified configuration of the server environment that reflects the recommended change to the server environment. As suggested above, the similarity score might be determined by a different machine learning model as compared to the machine learning model providing the recommended change(s). For instance, the recommended change(s) of a first machine learning model might be provided as input to a second machine learning model trained to output a similarity score based on such input.

The risk score and the similarity score may be inversely related. In general, the greater the change to the server environment, the riskier that change could be. In turn, aspects described herein relating to a risk score might similarly be performed with respect to a similarity score, and vice versa.

In step 305, the computing device may determine whether to automatically implement one or more of the recommendations output in step 304. In circumstances where the recommended changes received in step 304 are minor and particularly safe, then the computing device may automatically implement those changes. Such a determination may be based on the risk score and/or the similarity score. For example, the computing device may compare a risk score and/or a similarity score output by the trained machine learning model to a threshold associated with one or more applications provided by the server environment. If the computing device decides to automatically implement the one or more recommendations, the method 300 may proceed to step 306. Otherwise, if the computing devices do not automatically implement the one or more recommendations, the method 300 may proceed to step 307.

The threshold described above may be user-specified or automatically determined based on a variety of factors. For example, a threshold for the risk score may be based on the importance of the application(s) provided by the server environment, the overall risk tolerance of the organization managing the server environment, or the like. As another example, a threshold for the similarity score may be based on a willingness, by the organization, to have major changes to server infrastructure occur.

In step 306, the computing device may automatically implement one or more recommendations provided by the trained machine learning model. For example, the computing device may, as part of step 304, receive, as output from the trained machine learning model and in response to the input data, a second indication of a second recommended change to the server environment. In such an example, the second indication of the second recommended change to the server environment may comprise a second risk score associated with the second recommended change. Then, based on comparing the second risk score to the threshold associated with the one or more applications, the computing device may automatically implement the second recommended change.

Automatic implementation of recommendations may comprise transmitting one or more instructions to a cloud infrastructure provider. For instance, if a recommendation relates to changing a number of cloud servers (which might be logical and not physical in the case of some cloud service providers), then the computing device may transmit, to the cloud service provider, instructions to instantiate and/or retire one or more cloud servers. Similarly, if the recommendation relates to changing a size of a cloud server, then the computing device may transmit, to the cloud service provider, instructions to revise the size of one or more cloud servers. The particular format of such instructions may be based on the cloud service provider, as each cloud service provider may accept different types of instructions.

For safety and consistency reasons, automatic implementation of the one or more recommended changes may be implemented in a manner which preserves the safety and security of the server environment. For example, if possible, changes might be made to a development environment and prototyped before implemented on a production environment. As another example, changes might be made during times (e.g., the weekend, after business hours) that are not likely to affect a significant number of users.

The implementation of the one or more recommended changes may be logged and/or otherwise recorded. Such logging and/or recording may be legally required, required for network safety, and/or might be performed to allow for reinforcement learning of machine learning models (discussed below). For example, pursuant to regulatory server compliance recording constraints, the implementation of any accepted recommendation (whether automated or manual), in addition to any other observed changes to the server environment, may be recorded through a change management process to generate an official report to attest to the historical modifications of the server environment. In this manner, should any changes have unexpected results (e.g., unexpectedly causing some aspect of the server environment to crash), the changes can be identified and, if necessary, rolled back.

In step 307, the computing device may output a user interface element. The user interface element may comprise any indication, to a user and via a user interface, of one or more of the recommended changes referenced with respect to step 304. Such an output might be in the form of a graphic (e.g., a depiction of a server to be changed per the recommendation), text (e.g., a description of a recommended change), audio (e.g., a text-to-speech reading of the description), or the like. The user interface element may be configured to allow a user to respond to the recommendation(s) by accepting and/or rejecting the recommendation. For example, based on comparing the risk score to a threshold associated with the one or more applications, the computing device may cause output, by a second computing device, of a user interface element that provides an option to implement the recommended change to the server environment.

The user interface element may comprise a human-friendly version of the recommendation, as might be generated using a natural language processing algorithm. For example, the computing device may generate a narrative description of the recommended change by providing, as input to a natural language processing algorithm, the indication of the recommended change. In such an example, the user interface element may comprise the narrative description of the recommended change. In this manner, potentially unclear recommendations (e.g., "Server03 change size from 02 to 03") might be described to a user in a more human-friendly manner ("We recommend changing Server 03 from a medium size to a medium-large size, which adds 50% more computing resources at an additional cost"), which may in turn allow the user to make a more intelligent decision as to whether to accept the recommendation.

In some cases, the user interface element might depict differences between the server environment before and after a recommended change. For instance, where the one or more recommendations comprise a recommendation to change cloud providers, then the user interface element might depict the cloud environment architecture on a first cloud provider (e.g., AWS) and a different cloud environment architecture on a second cloud provider (e.g., Azure). In this manner, the user might be informed as to the differences in implementation that might result from changing cloud providers. Additional differences might be displayed as well: for example, if one cloud provider provides features that the other does not, those distinctions might be displayed.

In step 308, the computing device may receive a user response to the user interface element. The user response may comprise any sort of user input in response to the user interface element, such as the selection of a button (e.g., "Proceed," "Don't Proceed"), failure to select a "Don't Proceed" option after a period of time, selection of one or more recommended changes from a list, or the like.

In step 309, the computing device may determine whether the user response received in step 308 indicates that a user wished to implement a change to the server environment. As indicated above, the user response might indicate whether or not a user wants to proceed with one or more recommended changes, and thus step 309 determines if the user wished to proceed with any of those recommended changes. If so, the method 300 proceeds to step 310. Otherwise, the method 300 ends.

In step 310, the computing device may implement one or more changes to the server environment. The implementation process performed in step 310 may be the same or similar as the automatic implementation process described with respect to step 306, albeit in view of any user input received in step 308. For instance, the implementation might be performed as specified by the user in the user input (e.g., at a particular time, with respect to particular server resources). Such modification might involve modifying one or more operating parameters of one or more servers, regardless of whether they are locally hosted or hosted in one or more cloud environments. For example, based on user input received in response to the user interface element, the computing device may implement a recommended change by modifying one or more operating parameters of one or more servers of the server environment.

Whether as part of step 306 (which involves automatically implementing recommended change(s)) and/or step 310 (which involves implementing recommended change(s) based on user input), changes to the server environment may be made with respect to any aspect of the server environment. For example, the computing device may cause modification of a quantity of computing resources available to the one or more servers. This might include providing additional storage space, additional memory, additional processing power, more bandwidth, or the like. While such implementations might require some hardware changes (e.g., in the case of local hardware), such implementations might be made quickly and largely automatically in cloud environments (e.g., where the addition of computing resources simply adds cost and requires appropriate instructions to a cloud service provider). Additionally and/or alternatively, the computing device may cause modification of a quantity of servers that execute the one or more applications. For example, in a cloud environment, the computing device may transmit instructions to a cloud service provider that cause the cloud service provider to instantiate one or more servers (e.g., a copy of a server in one region to another region, or simply a redundant server).

As suggested above, the changes implemented with respect to the server environment (whether with respect to step 306 or step 310) may comprise changes to a cloud environment of one or more servers. For example, the one or more servers are executing in a first cloud environment, and modifying the one or more operating parameters of the one or more servers of the server environment may comprise implementing the one or more servers in a second cloud environment different than the first cloud environment.

In step 311, the computing device may further train the trained machine learning model. Results of changes to the server environment may be good or bad: for example, one change might make the server environment more stable, whereas another might decrease a utilization of a particular server below a particular threshold. In turn, such results might be provided as additional training data to any one of the artificial neural networks described above, which might thereby be able to learn which change(s) (if any) were particularly helpful for the network. In turn, as the steps depicted in the method 300 are performed over time (e.g., performed periodically), the efficacy and/or accuracy of the artificial neural network(s) may be improved. This process may be performed periodically: for example, the model(s) might be re-trained quarterly to re-classify all applications within the historical dataset with any new applications so as to improve model accuracy.

Further training the trained machine learning model may be based, in whole or in part, on reinforcement learning. This may be effectuated in a variety of ways, including based on the usage of the recommendation, the utility of the recommendation, and the state of the cloud environment as a whole. The reinforcement may be based on the usage of the recommendation itself (e.g., whether a change was in fact approved and adopted by a user). In such a circumstance, the acceptance or rejection of the recommendation may inform the trained machine learning model (via reinforcement learning) which recommendations are acceptable and not acceptable to users. In turn, the reinforcement learning performed on the usage of the recommendation can influence the model as to the end-user's preferences and assumed tolerances when not explicitly stated to create a highly personalized interaction model where recommendations continuously adapt. The reinforcement may additionally and/or alternatively be based on the utility of the recommendation (e.g., the benefits achieved by a recommendation). If a recommendation is particularly beneficial (e.g., helpful to a network by improving speed, efficiency, or the like), then that information may be used to reinforce the training of the trained machine learning model so as to encourage similar recommendations in the future. The opposite may apply as well: if the recommendation is not particularly beneficial, then the trained machine learning model may be discouraged (via reinforcement learning) from making similar recommendations in the future. As such, the reinforcement learning may consider the outcome of any given change to create a score or "reward" by determining the relative success of taking the recommendation or the relative loss incurred by not taking the recommendation to tune the future recommendations towards a strategic long-term optimization output maximizing the outcome of the recommendation. The reinforcement learning may be additionally and/or alternatively based on the state of the cloud environment as a whole. Various changes (e.g., based on recommendations or otherwise) to an environment might be monitored, a health of the environment might be determined, and such a health might be indicative of the benefits (and/or downsides) of various changes to the environment. As such, through a holistic view of the server environment where information ingestion may include elements outside of the direct recommendation, the reinforcement learning model may be able to tune recommendations based on maximizing towards the positive underlying trends impacting the entire environment.

The process depicted in FIG. 3 may be repeated periodically. For example, on a daily basis, recommendations might be generated and, as applicable, either automatically implemented and/or displayed for user consideration.

Figure 4:
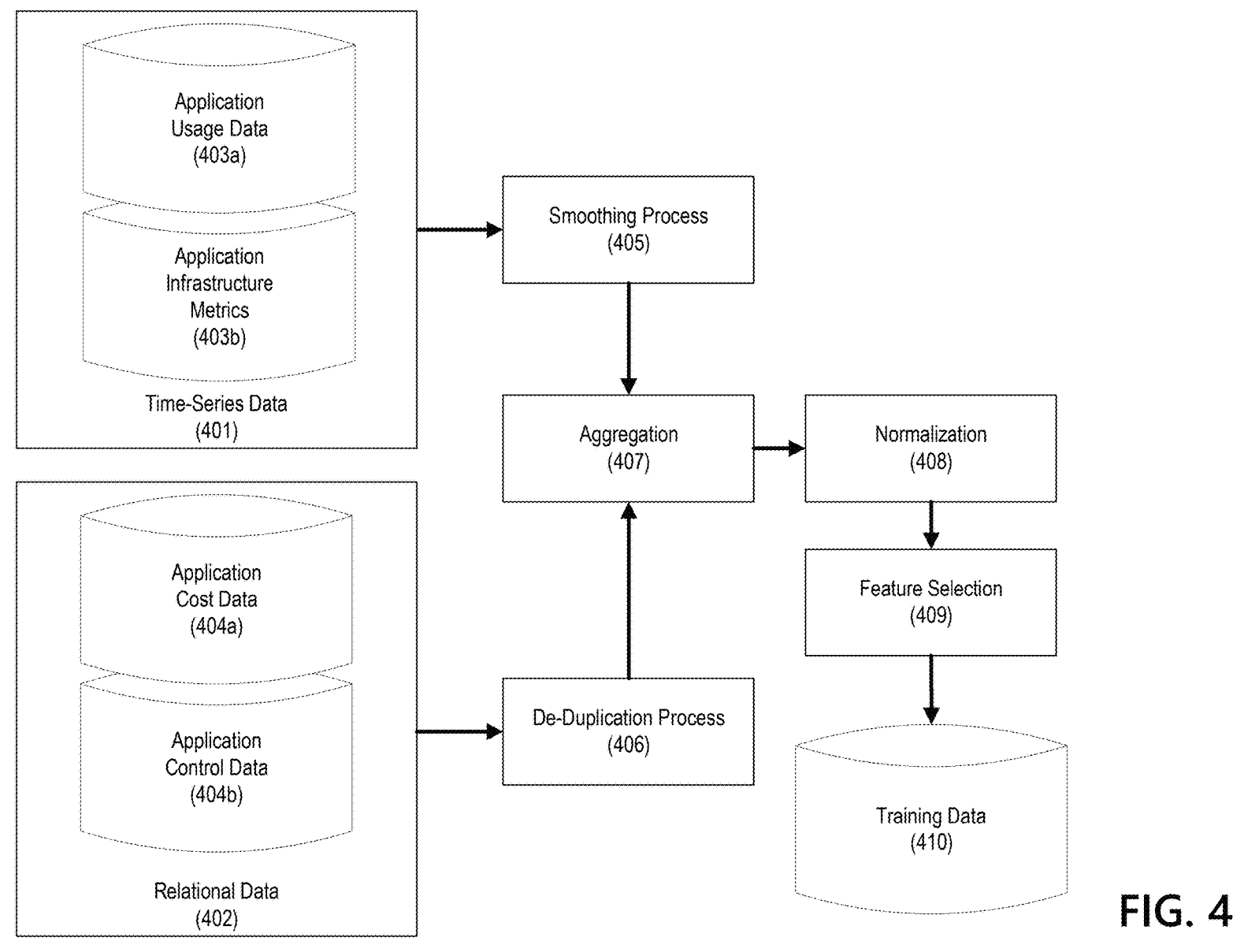

FIG. 4 depicts an illustrative process whereby time-series data 401 and relational data 402 is processed in a data cleaning phase and ultimately processed into training data 410, which may be the same or similar training data as described with respect to step 310 of FIG. 3. In this manner, as part of collecting the training data in step 301, the computing device may perform all or portions of the steps depicted in FIG. 4.

For illustrative purposes, FIG. 4 depicts that the time-series data 401 comprises application usage data 403*a* and application infrastructure metrics 403*b* and depicts that the relational data 402 comprises application cost data 404*a* and application control data 404*b*. As indicated above with respect to step 301, the data collected for training data might vary widely, such that this data is not necessarily required.

The time-series data 401 may be processed through a smoothing process 405. The smoothing process 405 may comprise using one or more mathematical processes and/or techniques (e.g., an exponential smoothing process) to smooth the time-series data in a manner which avoids excess noise and/or undesirable short-term fluctuations.

The relational data 402 may be processed through a de-duplication process 406. The de-duplication process may be performed by parsing the relational data 402 to remove duplicate entries from the relational data such that duplicate entries do not undesirably bias the model.

The smoothing process 405 and the de-duplication process 406 may be performed, in part, due to the high variation of metric collection techniques from different cloud providers and because standardized and/or otherwise cleaned data may ensure that resultant training data generates a more accurate trained machine learning model. After all, highly varied data and/or data with a lot of noise could greatly impact the reliability of any resultant trained machine learning model.

Once the time-series data 401 is smoothed and once the relational data 402 is de-duplicated, the data may be aggregated in an aggregation step 407. Aggregation may be performed based on individual features (e.g., server utilization per server, memory utilization) and/or at an aggregate level (e.g., total memory utilization across one or more portions of the server environment, total number of servers, etc). Then, the aggregated data may be normalized 408. The normalization process may be performed by normalizing per metric, such as normalizing all processor utilization-related measurements (e.g., CPU cycles), normalizing memory-related measurements (e.g., amount of memory used), normalizing storage-related measurements (e.g., amount of storage used), or the like. For example, various elements of the aggregated data may be processed such that date/time values are in the same format, that currency formats are in the same currency, and the like. This process may advantageously be performed at a fleet level to ensure that subsequent machine learning-based recommendations take into account the entirety of resources provided to an application. For instance, serverless and server-full infrastructure metrics are often not the same because serverless implementations might not necessarily expose processor utilization rates. To remedy that issue, normalization of data per metric might be performed to enable the comparison of resources at common scaled ranges of values. In this manner, the stability of machine learning prediction may be improved.

Then, after the normalization process, a feature selection process 409 may be performed. Feature selection might involve using supervised learning to filter and weight features of data based on the Fishers score of individual features and correlation coefficient(s) between various metrics in the data. While such supervised learning might provide significant improvements to the manner with which machine learning is performed, unsupervised machine learning processes might also be performed. The feature selection process may comprise filtering and/or otherwise modifying the aggregated and normalized data such that particular features are selected for emphasis by the machine learning model during training. This process may comprise selecting one or more variables and one or more predictors.

Figure 5:
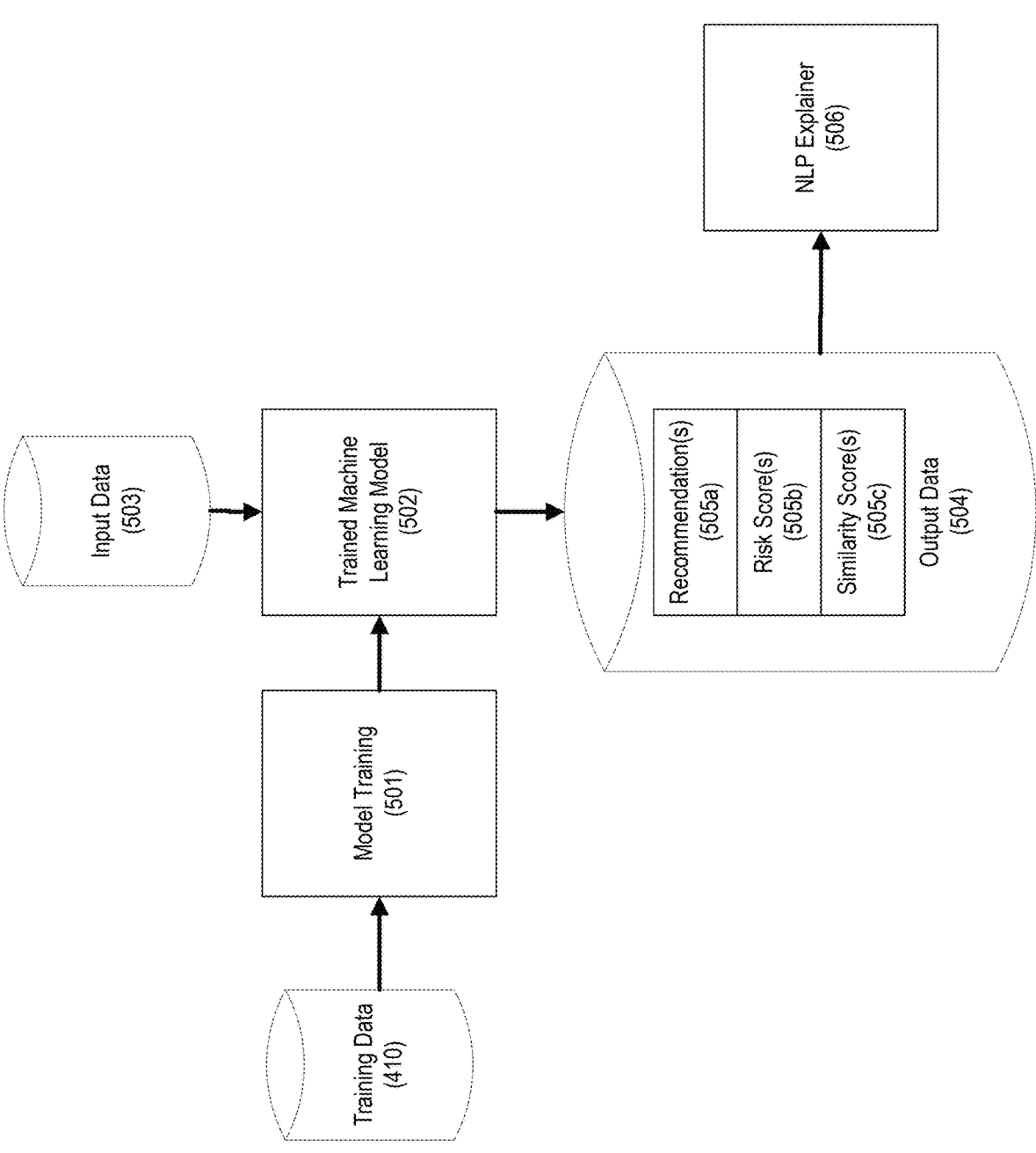
FIG. 5 illustrates the training of a machine learning model and use of natural language processing to explain recommendations output by a trained machine learning model.

FIG. 5 illustrates the training of a machine learning model and use of natural language processing to explain recommendations output by a trained machine learning model. As shown in FIG. 5, the training data 410 is subject to a model training process 501, which generates a trained machine learning model 502. This process may be the same or similar as step 301 and/or step 302 of FIG. 3. Then, input data 503 may be provided to the trained machine learning model 502, which might generate output data 504 that comprises one or more recommendations 505*a*, one or more risk scores 505*b*, and one or more similarity scores 505*c*. This process may be the same or similar as step 303 and step 304 of FIG. 3. Then, the output data 504 might be processed using a natural language processing explainer module to generate a narrative description of the output data, which might be provided to a user as part of a user interface element. This process may be the same or similar as step 307 of FIG. 3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to automatically recommend cloud server configuration changes, the computing device comprising:

one or more processors; and memory storing instructions that, when executed by the one or more processors, cause the computing device to:

receive training data comprising a history of performance measurements of a server environment that executes one or more applications;

generate a trained machine learning model to output infrastructure modification recommendations by training, based on the training data, a machine learning model implemented using an artificial neural network, wherein training the machine learning model comprises modifying one or more weights of the artificial neural network based on the training data;

provide, to the trained machine learning model, input data comprising an indication of a current configuration of the server environment;

receive, as output from the trained machine learning model and in response to the input data, an indication of a recommended change to the server environment, wherein the indication of the recommended change to the server environment comprises a risk score associated with the recommended change;

based on comparing the risk score to a threshold associated with the one or more applications, cause output, by a second computing device, of a user interface element that provides an option to implement the recommended change to the server environment; and based on user input received in response to the user interface element, implement the recommended change by modifying one or more operating parameters of one or more servers of the server environment.

2. The computing device of claim 1, wherein the instructions, when executed by the one or more processors, cause the computing device to cause output of the user interface element by causing the computing device to:

generate a narrative description of the recommended change by providing, as input to a natural language processing algorithm, the indication of the recommended change, wherein the user interface element comprises the narrative description of the recommended change.

3. The computing device of claim 1, wherein the instructions, when executed by the one or more processors, further cause the computing device to:

determine one or more operating constraints of the one or more applications provided by the server environment, wherein the input data further comprises an indication of the one or more operating constraints.

4. The computing device of claim 1, wherein the instructions, when executed by the one or more processors, further cause the computing device to:

receive, as output from the trained machine learning model and in response to the input data, a second indication of a second recommended change to the server environment, wherein the second indication of the second recommended change to the server environment comprises a second risk score associated with the second recommended change; and based on comparing the second risk score to the threshold associated with the one or more applications, automatically implement the second recommended change.

5. The computing device of claim 1, wherein the indication of the recommended change to the server environment further comprises a similarity score, and wherein the similarity score is based on a comparison of the current configuration of the server environment to a modified configuration of the server environment that reflects the recommended change to the server environment.

6. The computing device of claim 1, wherein the training data comprises one or more of:

application usage data for the one or more applications;

application infrastructure metrics associated with the one or more applications;

cost data associated with the one or more applications; and control data associated with the one or more applications.

7. The computing device of claim 1, wherein the modifying the one or more operating parameters of the one or more servers of the server environment comprises:

modifying a quantity of computing resources available to the one or more servers; or modifying a quantity of servers that execute the one or more applications.

8. The computing device of claim 1, wherein the one or more servers are executing in a first cloud environment, and wherein the modifying the one or more operating parameters of the one or more servers of the server environment comprises implementing the one or more servers in a second cloud environment different than the first cloud environment.

9. A method for automatically recommending cloud server configuration changes, the method comprising:

receiving, by a computing device, training data comprising a history of performance measurements of a server environment that executes one or more applications;

generating, by the computing device, a trained machine learning model to output infrastructure modification recommendations by training, based on the training data, a machine learning model implemented using an artificial neural network, wherein training the machine learning model comprises modifying one or more weights of the artificial neural network based on the training data;

providing, by the computing device and to the trained machine learning model, input data comprising an indication of a current configuration of the server environment;

receiving, by the computing device, as output from the trained machine learning model, and in response to the input data, an indication of a recommended change to the server environment, wherein the indication of the recommended change to the server environment comprises a risk score associated with the recommended change;

based on comparing the risk score to a threshold associated with the one or more applications, causing output, by a second computing device, of a user interface element that provides an option to implement the recommended change to the server environment; and based on user input received in response to the user interface element, implementing, by the computing device, the recommended change by modifying one or more operating parameters of one or more servers of the server environment.

10. The method of claim 9, wherein the causing output of the user interface element comprises:

generating a narrative description of the recommended change by providing, as input to a natural language processing algorithm, the indication of the recommended change, wherein the user interface element comprises the narrative description of the recommended change.

11. The method of claim 9, further comprising:

determining one or more operating constraints of the one or more applications provided by the server environment, wherein the input data further comprises an indication of the one or more operating constraints.

12. The method of claim 9, further comprising:

receiving, as output from the trained machine learning model and in response to the input data, a second indication of a second recommended change to the server environment, wherein the second indication of the second recommended change to the server environment comprises a second risk score associated with the second recommended change; and based on comparing the second risk score to the threshold associated with the one or more applications, automatically implementing the second recommended change.

13. The method of claim 9, wherein the indication of the recommended change to the server environment further comprises a similarity score, wherein the similarity score is based on a comparison of the current configuration of the server environment to a modified configuration of the server environment that reflects the recommended change to the server environment.

14. The method of claim 9, wherein the training data comprises one or more of:

application usage data for the one or more applications;

application infrastructure metrics associated with the one or more applications;

cost data associated with the one or more applications; and control data associated with the one or more applications.

15. One or more non-transitory computer-readable media storing instructions configured to automatically recommend cloud server configuration changes, wherein the instructions, when executed by one or more processors of a computing device, cause the computing device to:

receive training data comprising a history of performance measurements of a server environment that executes one or more applications;

generate a trained machine learning model to output infrastructure modification recommendations by training, based on the training data, a machine learning model implemented using an artificial neural network, wherein training the machine learning model comprises modifying one or more weights of the artificial neural network based on the training data;

provide, to the trained machine learning model, input data comprising an indication of a current configuration of the server environment;

receive, as output from the trained machine learning model and in response to the input data, an indication of a recommended change to the server environment, wherein the indication of the recommended change to the server environment comprises a risk score associated with the recommended change;

based on comparing the risk score to a threshold associated with the one or more applications, cause output, by a second computing device, of a user interface element that provides an option to implement the recommended change to the server environment; and based on user input received in response to the user interface element, implement the recommended change by modifying one or more operating parameters of one or more servers of the server environment.

16. The one or more non-transitory computer-readable media of claim 15, wherein the instructions, when executed by the one or more processors, cause the computing device to cause output of the user interface element by causing the computing device to:

generate a narrative description of the recommended change by providing, as input to a natural language processing algorithm, the indication of the recommended change, wherein the user interface element comprises the narrative description of the recommended change.

17. The one or more non-transitory computer-readable media of claim 15, wherein the instructions, when executed by the one or more processors, further cause the computing device to:

determine one or more operating constraints of the one or more applications provided by the server environment, wherein the input data further comprises an indication of the one or more operating constraints.

18. The one or more non-transitory computer-readable media of claim 15, wherein the instructions, when executed by the one or more processors, further cause the computing device to:

receive, as output from the trained machine learning model and in response to the input data, a second indication of a second recommended change to the server environment, wherein the second indication of the second recommended change to the server environment comprises a second risk score associated with the second recommended change; and based on comparing the second risk score to the threshold associated with the one or more applications, automatically implement the second recommended change.

19. The one or more non-transitory computer-readable media of claim 15, wherein the indication of the recommended change to the server environment further comprises a similarity score, and wherein the similarity score is based on a comparison of the current configuration of the server environment to a modified configuration of the server environment that reflects the recommended change to the server environment.

20. The one or more non-transitory computer-readable media of claim 15, wherein the training data comprises one or more of:

application usage data for the one or more applications;

application infrastructure metrics associated with the one or more applications;

cost data associated with the one or more applications; and control data associated with the one or more applications.

* * * * *